US007674181B2

(12) United States Patent
Yates

(10) Patent No.: US 7,674,181 B2
(45) Date of Patent: Mar. 9, 2010

(54) GAME PROCESSING

(75) Inventor: Mark Yates, London (GB)

(73) Assignee: Sony Computer Entertainment Europe Ltd., London (GB)

( * ) Notice: Subject to any disclaimer, the term of this patent is extended or adjusted under 35 U.S.C. 154(b) by 907 days.

(21) Appl. No.: 11/216,462

(22) Filed: Aug. 31, 2005

(65) Prior Publication Data

US 2007/0059670 A1 Mar. 15, 2007

(51) Int. Cl.

*G09B 5/04* (2006.01)
*G09B 5/00* (2006.01)
*G09B 7/00* (2006.01)
*G10H 7/00* (2006.01)

(52) U.S. Cl. .......................... 463/35; 463/31; 434/320; 984/200; 984/254; 984/303

(58) Field of Classification Search ............ 463/31-35; 434/320

See application file for complete search history.

(56) References Cited

U.S. PATENT DOCUMENTS 6,352,432 B1 * 3/2002 Tsai et al. ............... 434/307 A
2005/0255914 A1 * 11/2005 McHale et al. ................ 463/31

* cited by examiner

*Primary Examiner*—Peter DungBa Vo
*Assistant Examiner*—Frank M Leiva
(74) *Attorney, Agent, or Firm*—Katten Muchin Rosenman LLP

(57) ABSTRACT

Game processing apparatus comprising:

an indication generator operable to generate an indication of a sequence of target actions to be executed by a user;

a detector operable to detect user actions executed by said user;

comparison logic operable to compare said target actions with said user actions to determine whether said target actions have been successfully completed by said user actions; and scoring logic operable, when in a non-scoring mode, to detect a first pattern of target actions that have been successfully completed with respect to target actions that have not been successfully completed, as determined by said comparison logic, said scoring logic entering a scoring mode upon detection of said first pattern, said scoring logic operable, when in said scoring mode, to detect a second pattern of target actions that have been successfully completed with respect to target actions that have not been successfully completed, as determined by said comparison logic, said scoring logic entering said non-scoring mode upon detection of said second pattern, said scoring logic operable to generate a score for said user when said scoring logic is in said scoring mode, said score being dependent upon said determination by said comparison logic.

11 Claims, 7 Drawing Sheets

```
<SENTENCE>
  <NOTE MidiNote="0" Duration="2" Lyric="" Rap="Yes"></NOTE>
  <NOTE MidiNote="50" Duration="2" Lyric="I" Rap="Yes" FreeStyle="Yes">
     <POINT Type="Voice End" Start="0.345" Stop="0.415" Length="0.1"></POINT>
  </NOTE>
  <NOTE MidiNote="50" Duration="2" Lyric="love" Rap="Yes" FreeStyle="Yes">
     <POINT Type="Fric" Start="0.282" Stop="0.342" Length="0.0"></POINT>
  </NOTE>
  <NOTE MidiNote="0" Duration="2" Lyric="" Rap="Yes"></NOTE>
  <NOTE MidiNote="50" Duration="2" Lyric="you" Rap="Yes" FreeStyle="Yes">
     <POINT Type="Voice" Start="0.067" Stop="0.277" Length="0.08"></POINT>
  </NOTE>
  <NOTE MidiNote="0" Duration="2" Lyric="" Rap="Yes"></NOTE>
  <NOTE MidiNote="50" Duration="4" Lyric="too" Rap="Yes" FreeStyle="Yes">
     <POINT Type="Glottal" Start="0.001" Stop="0.131"></POINT>
  </NOTE>
  <NOTE MidiNote="0" Duration="2" Lyric="" Rap="Yes"></NOTE>
</SENTENCE>
```

Fig 5

GAME PROCESSING

BACKGROUND OF THE INVENTION

1. Field of the Invention

This invention relates to electronic game processing. A particular example involves the control of video game processing operations, but the invention has more general application to other types of electronic game processing.

2. Description of the Prior Art

In a conventional video games machine, a user views the game on a video monitor or television screen, and controls operation of the game using a hand-held keypad or joystick. With some games machines such as the Sony® PlayStation® 2 machine, a handheld controller provides two joysticks and several user-operated keys, along with a vibrating element to provide tactile feedback to the user of events occurring within the game.

Some games require the user to carry out certain actions in response to an indication (e.g. on a display) of a target action. The user is judged on the accuracy of his response to the target actions. For example, the system might test whether the user carried out the correct action, or whether the user carried out the action at the correct time. An example of such a game is a so-called karaoke game, in which the user is presented with a series of words to be sung to form a song. A backing track for the song is played on a loudspeaker and the user sings along into a microphone. The user may be judged on (for example) the pitch and timing of his singing.

SUMMARY OF THE INVENTION

According to an aspect of the invention, there is provided a game processing apparatus comprising:

an indication generator operable to generate an indication of a sequence of target actions to be executed by a user;

a detector operable to detect user actions executed by said user;

comparison logic operable to compare said target actions with said user actions to determine whether said target actions have been successfully completed by said user actions; and scoring logic operable, when in a non-scoring mode, to detect a first pattern of target actions that have been successfully completed with respect to target actions that have not been successfully completed, as determined by said comparison logic, said scoring logic entering a scoring mode upon detection of said first pattern, said scoring logic operable, when in said scoring mode, to detect a second pattern of target actions that have been successfully completed with respect to target actions that have not been successfully completed, as determined by said comparison logic, said scoring logic entering said non-scoring mode upon detection of said second pattern, said scoring logic operable to generate a score for said user in respect of user actions when said scoring logic is in said scoring mode, said score being dependent upon said determination by said comparison logic.

This invention recognises potential problems in target action—user action games. For example, a games machine may detect an action that has not actually been performed by the user (such as a microphone in a karaoke game picking up background noise not related to the user) and if this action coincidentally corresponds to a target action, then the games machine could determine (erroneously) that the target action has been successfully completed. Additionally, the user may actually be performing user actions in an attempt to successfully complete target actions, but the user may be very bad at performing the target actions consistently, so the successful completion of a target action by the user is more due to chance than the actual skill/talent of the user. Embodiments of the invention therefore, in a non-scoring mode, detect whether a first pattern of successfully and unsuccessfully completed target actions occurs. In preferred embodiments, this involves the use of a "build-up" period when in the non-scoring mode to determine a pattern (e.g. the length of a sequence) of successive target actions that are successfully completed. If the first pattern is detected then a scoring mode is entered (it being determined that (i) the input to the games machine is as a result of user actions and not spurious unrelated events and (ii) the successful completion of the targets actions is due to the skill of the user). If, at any point in the scoring mode, a second pattern of successfully and unsuccessfully completed target actions is detected, then the games machine reverts to the non-scoring mode. In preferred embodiments, this involves, when in the scoring mode, determining the length of a sequence of successive target actions that are not successfully completed.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 5 schematically illustrates a part of a song file;

DESCRIPTION OF THE PREFERRED EMBODIMENTS

Figure 1:
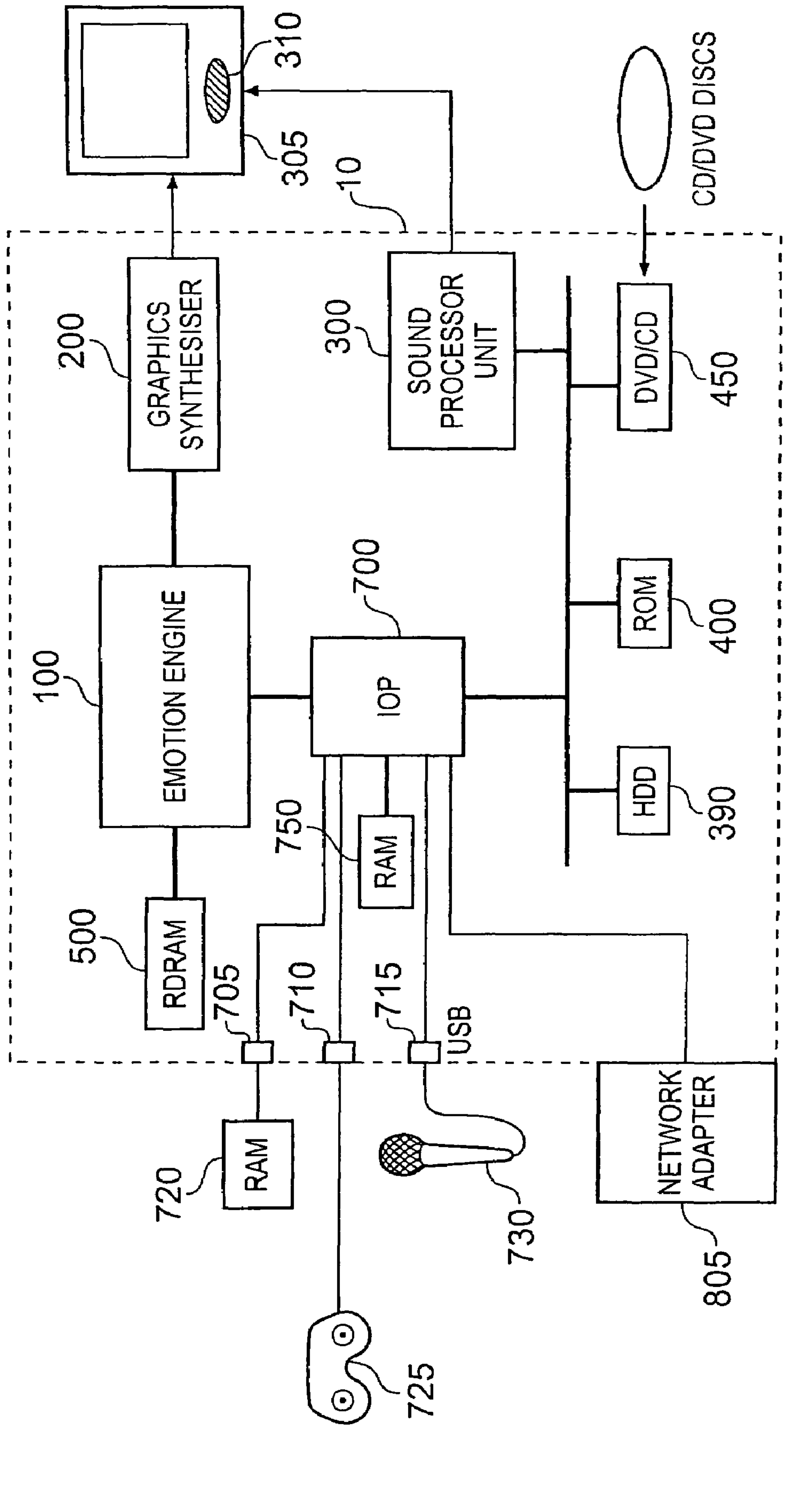
FIG. 1 schematically illustrates the overall system architecture of a PlayStation2 machine.

FIG. 1 schematically illustrates the overall system architecture of a PlayStation2 machine. A system unit 10 is provided, with various peripheral devices connectable to the system unit. It will be appreciated that the PlayStation2 machine is just an example of such a system unit 10 and that other embodiments may make use of other system units.

The system unit 10 comprises: an Emotion Engine 100; a Graphics Synthesiser 200; a sound processor unit 300 having dynamic random access memory (DRAM); a read only memory (ROM) 400; a compact disc (CD) and digital versatile disc (DVD) reader 450; a Rambus Dynamic Random Access Memory (RDRAM) unit 500; an input/output processor (IOP) 700 with dedicated RAM 750. An (optional) external hard disk drive (HDD) 390 may be connected.

The input/output processor 700 has two Universal Serial Bus (USB) ports 715 and an iLink or IEEE 1394 port (iLink is the Sony Corporation implementation of the IEEE 1394 standard). The IOP 700 handles all USB, iLink and game controller data traffic. For example when a user is playing a game, the IOP 700 receives data from the game controller and directs it to the Emotion Engine 100 which updates the current state of the game accordingly. The IOP 700 has a Direct Memory Access (DMA) architecture to facilitate rapid data transfer rates. DMA involves transfer of data from main memory to a device without passing it through the CPU. The USB interface is compatible with Open Host Controller Interface (OHCI) and can handle data transfer rates of between 1.5 Mbps and 12 Mbps. Provision of these interfaces means that the PlayStation2 machine is potentially compatible with peripheral devices such as video cassette recorders (VCRs), digital cameras, microphones, set-top boxes, printers, keyboard, mouse and joystick.

Generally, in order for successful data communication to occur with a peripheral device connected to a USB port 715, an appropriate piece of software such as a device driver should be provided. Device driver technology is very well known and will not be described in detail here, except to say that the skilled man will be aware that a device driver or similar software interface may be required in the embodiment described here.

In the present embodiment, a USB microphone 730 is connected to the USB port. It will be appreciated that the USB microphone 730 may be a hand-held microphone or may form part of a head-set that is worn by the human operator. The advantage of wearing a head-set is that the human operator's hand are free to perform other actions. The microphone includes an analogue-to-digital converter (ADC) and a basic hardware-based real-time data compression and encoding arrangement, so that audio data are transmitted by the microphone 730 to the USB port 715 in an appropriate format, such as 16-bit mono PCM (an uncompressed format) for decoding at the PlayStation2 system unit 10.

Apart from the USB ports, two other ports 705, 710 are proprietary sockets allowing the connection of a proprietary non-volatile RAM memory card 720 for storing game-related information, a hand-held game controller 725 or a device (not shown) mimicking a hand-held controller, such as a dance mat.

The system unit 10 may be connected to a network adapter 805 that provides an interface (such as an Ethernet interface) to a network. This network may be, for example, a LAN, a WAN or the Internet. The network may be a general network or one that is dedicated to game related communication. The network adapter 805 allows data to be transmitted to and received from other system units 10 that are connected to the same network, (the other system units 10 also having corresponding network adapters 805).

The Emotion Engine 100 is a 128-bit Central Processing Unit (CPU) that has been specifically designed for efficient simulation of 3 dimensional (3D) graphics for games applications. The Emotion Engine components include a data bus, cache memory and registers, all of which are 128-bit. This facilitates fast processing of large volumes of multi-media data. Conventional PCs, by way of comparison, have a basic 64-bit data structure. The floating point calculation performance of the PlayStation2 machine is 6.2 GFLOPs. The Emotion Engine also comprises MPEG2 decoder circuitry which allows for simultaneous processing of 3D graphics data and DVD data. The Emotion Engine performs geometrical calculations including mathematical transforms and translations and also performs calculations associated with the physics of simulation objects, for example, calculation of friction between two objects. It produces sequences of image rendering commands which are subsequently utilised by the Graphics Synthesiser 200. The image rendering commands are output in the form of display lists. A display list is a sequence of drawing commands that specifies to the Graphics Synthesiser which primitive graphic objects (e.g. points, lines, triangles, sprites) to draw on the screen and at which co-ordinates. Thus a typical display list will comprise commands to draw vertices, commands to shade the faces of polygons, render bitmaps and so on. The Emotion Engine 100 can asynchronously generate multiple display lists.

The Graphics Synthesiser 200 is a video accelerator that performs rendering of the display lists produced by the Emotion Engine 100. The Graphics Synthesiser 200 includes a graphics interface unit (GIF) which handles, tracks and manages the multiple display lists. The rendering function of the Graphics Synthesiser 200 can generate image data that supports several alternative standard output image formats, i.e., NTSC/PAL, High Definition Digital TV and VESA. In general, the rendering capability of graphics systems is defined by the memory bandwidth between a pixel engine and a video memory, each of which is located within the graphics processor. Conventional graphics systems use external Video Random Access Memory (VRAM) connected to the pixel logic via an off-chip bus which tends to restrict available bandwidth. However, the Graphics Synthesiser 200 of the PlayStation2 machine provides the pixel logic and the video memory on a single high-performance chip which allows for a comparatively large 38.4 Gigabyte per second memory access bandwidth. The Graphics Synthesiser is theoretically capable of achieving a peak drawing capacity of 75 million polygons per second. Even with a full range of effects such as textures, lighting and transparency, a sustained rate of 20 million polygons per second can be drawn continuously. Accordingly, the Graphics Synthesiser 200 is capable of rendering a film-quality image.

The Sound Processor Unit (SPU) 300 is effectively the soundcard of the system which is capable of recognising 3D digital sound such as Digital Theater Surround (DTS®) sound and AC-3 (also known as Dolby Digital) which is the sound format used for DVDs.

A display and sound output device 305, such as a video monitor or television set with an associated loudspeaker arrangement 310, is connected to receive video and audio signals from the graphics synthesiser 200 and the sound processing unit 300.

The main memory supporting the Emotion Engine 100 is the RDRAM (Rambus Dynamic Random Access Memory) module 500 produced by Rambus Incorporated. This RDRAM memory subsystem comprises RAM, a RAM controller and a bus connecting the RAM to the Emotion Engine 100.

Figure 2:
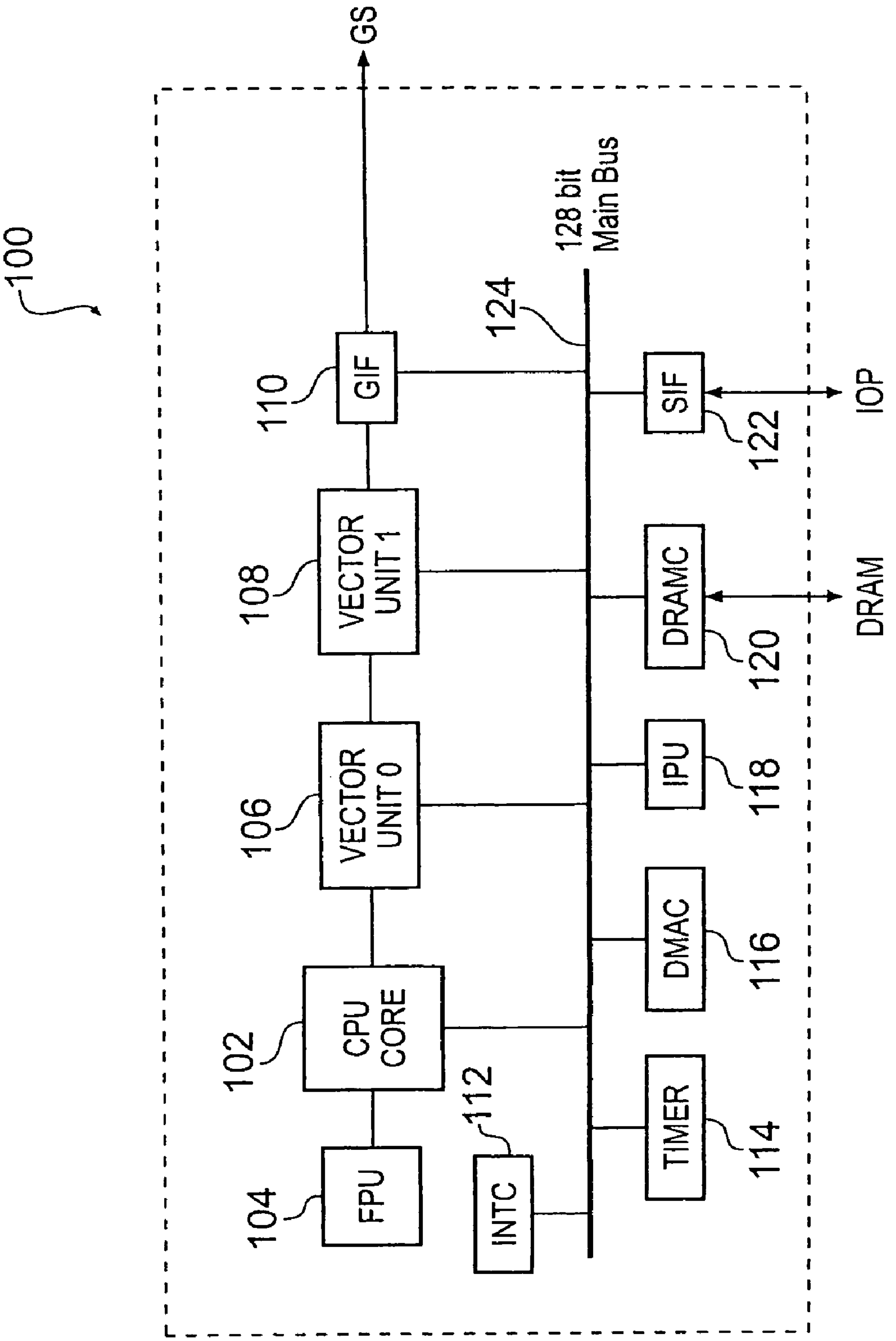
FIG. 2 schematically illustrates the architecture of an Emotion Engine.

FIG. 2 schematically illustrates the architecture of the Emotion Engine 100 of FIG. 1. The Emotion Engine 100 comprises: a floating point unit (FPU) 104; a central processing unit (CPU) core 102; vector unit zero (VU0) 106; vector unit one (VU1) 108; a graphics interface unit (GIF) 110; an interrupt controller (INTC) 112; a timer unit 114; a direct memory access controller 116; an image data processor unit (IPU) 118; a dynamic random access memory controller (DRAMC) 120; a sub-bus interface (SIF) 122; and all of these components are connected via a 128-bit main bus 124.

The CPU core 102 is a 128-bit processor clocked at 300 MHz. The CPU core has access to 32 MB of main memory via the DRAMC 120. The CPU core 102 instruction set is based on MIPS III RISC with some MIPS IV RISC instructions together with additional multimedia instructions. MIPS III and IV are Reduced Instruction Set Computer (RISC) instruction set architectures proprietary to MIPS Technologies, Inc. Standard instructions are 64-bit, two-way superscalar, which means that two instructions can be executed simultaneously. Multimedia instructions, on the other hand, use 128-bit instructions via two pipelines. The CPU core 102 comprises a 16 KB instruction cache, an 8 KB data cache and a 16 KB scratchpad RAM which is a portion of cache reserved for direct private usage by the CPU.

The FPU 104 serves as a first co-processor for the CPU core 102. The vector unit 106 acts as a second co-processor. The FPU 104 comprises a floating point product sum arithmetic logic unit (FMAC) and a floating point division calculator (FDIV). Both the FMAC and FDIV operate on 32-bit values so when an operation is carried out on a 128-bit value (composed of four 32-bit values) an operation can be carried out on all four parts concurrently. For example adding 2 vectors together can be done at the same time.

The vector units 106 and 108 perform mathematical operations and are essentially specialised FPUs that are extremely fast at evaluating the multiplication and addition of vector equations. They use Floating-Point Multiply-Adder Calculators (FMACs) for addition and multiplication operations and Floating-Point Dividers (FDIVs) for division and square root operations. They have built-in memory for storing micro-programs and interface with the rest of the system via Vector Interface Units (VIFs). Vector unit zero 106 can work as a coprocessor to the CPU core 102 via a dedicated 128-bit bus so it is essentially a second specialised FPU. Vector unit one 108, on the other hand, has a dedicated bus to the Graphics synthesiser 200 and thus can be considered as a completely separate processor. The inclusion of two vector units allows the software developer to split up the work between different parts of the CPU and the vector units can be used in either serial or parallel connection.

Vector unit zero 106 comprises 4 FMACS and 1 FDIV. It is connected to the CPU core 102 via a coprocessor connection. It has 4 Kb of vector unit memory for data and 4 Kb of micro-memory for instructions. Vector unit zero 106 is useful for performing physics calculations associated with the images for display. It primarily executes non-patterned geometric processing together with the CPU core 102.

Vector unit one 108 comprises 5 FMACS and 2 FDIVs. It has no direct path to the CPU core 102, although it does have a direct path to the GIF unit 110. It has 16 Kb of vector unit memory for data and 16 Kb of micro-memory for instructions. Vector unit one 108 is useful for performing transformations. It primarily executes patterned geometric processing and directly outputs a generated display list to the GIF 110.

The GIF 110 is an interface unit to the Graphics Synthesiser 200. It converts data according to a tag specification at the beginning of a display list packet and transfers drawing commands to the Graphics Synthesiser 200 whilst mutually arbitrating multiple transfer. The interrupt controller (INTC) 112 serves to arbitrate interrupts from peripheral devices, except the DMAC 116.

The timer unit 114 comprises four independent timers with 16-bit counters. The timers are driven either by the bus clock (at 1/16 or 1/256 intervals) or via an external clock. The DMAC 116 handles data transfers between main memory and peripheral processors or main memory and the scratch pad memory. It arbitrates the main bus 124 at FMAC and FDIV operate on 32-bit values so when an operation is carried out on a 128-bit value (composed of four 32-bit values) an operation can be carried out on all four parts concurrently. For example adding 2 vectors together can be done at the same time.

The vector units 106 and 108 perform mathematical operations and are essentially specialised FPUs that are extremely fast at evaluating the multiplication and addition of vector equations. They use Floating-Point Multiply-Adder Calculators (FMACs) for addition and multiplication operations and Floating-Point Dividers (FDIVs) for division and square root operations. They have built-in memory for storing micro-programs and interface with the rest of the system via Vector Interface Units (VIFs). Vector unit zero 106 can work as a coprocessor to the CPU core 102 via a dedicated 128-bit bus so it is essentially a second specialised FPU. Vector unit one 108, on the other hand, has a dedicated bus to the Graphics synthesiser 200 and thus can be considered as a completely separate processor. The inclusion of two vector units allows the software developer to split up the work between different parts of the CPU and the vector units can be used in either serial or parallel connection.

Vector unit zero 106 comprises 4 FMACS and 1 FDIV. It is connected to the CPU core 102 via a coprocessor connection. It has 4 Kb of vector unit memory for data and 4 Kb of micro-memory for instructions. Vector unit zero 106 is useful for performing physics calculations associated with the images for display. It primarily executes non-patterned geometric processing together with the CPU core 102.

Vector unit one 108 comprises 5 FMACS and 2 FDIVs. It has no direct path to the CPU core 102, although it does have a direct path to the GIF unit 110. It has 16 Kb of vector unit memory for data and 16 Kb of micro-memory for instructions. Vector unit one 108 is useful for performing transformations. It primarily executes patterned geometric processing and directly outputs a generated display list to the GIF 110.

The GIF 110 is an interface unit to the Graphics Synthesiser 200. It converts data according to a tag specification at the beginning of a display list packet and transfers drawing commands to the Graphics Synthesiser 200 whilst mutually arbitrating multiple transfer. The interrupt controller (INTC) 112 serves to arbitrate interrupts from peripheral devices, except the DMAC 116.

The timer unit 114 comprises four independent timers with 16-bit counters. The timers are driven either by the bus clock (at 1/16 or 1/256 intervals) or via an external clock. The DMAC 116 handles data transfers between main memory and peripheral processors or main memory and the scratch pad memory. It arbitrates the main bus 124 at the same time. Performance optimisation of the DMAC 116 is a key way by which to improve Emotion Engine performance. The image processing unit (IPU) 118 is an image data processor that is used to expand compressed animations and texture images. It performs I-PICTURE Macro-Block decoding, colour space conversion and vector quantisation. Finally, the sub-bus interface (SIF) 122 is an interface unit to the IOP 700. It has its own memory and bus to control I/O devices such as sound chips and storage devices.

Figure 3:
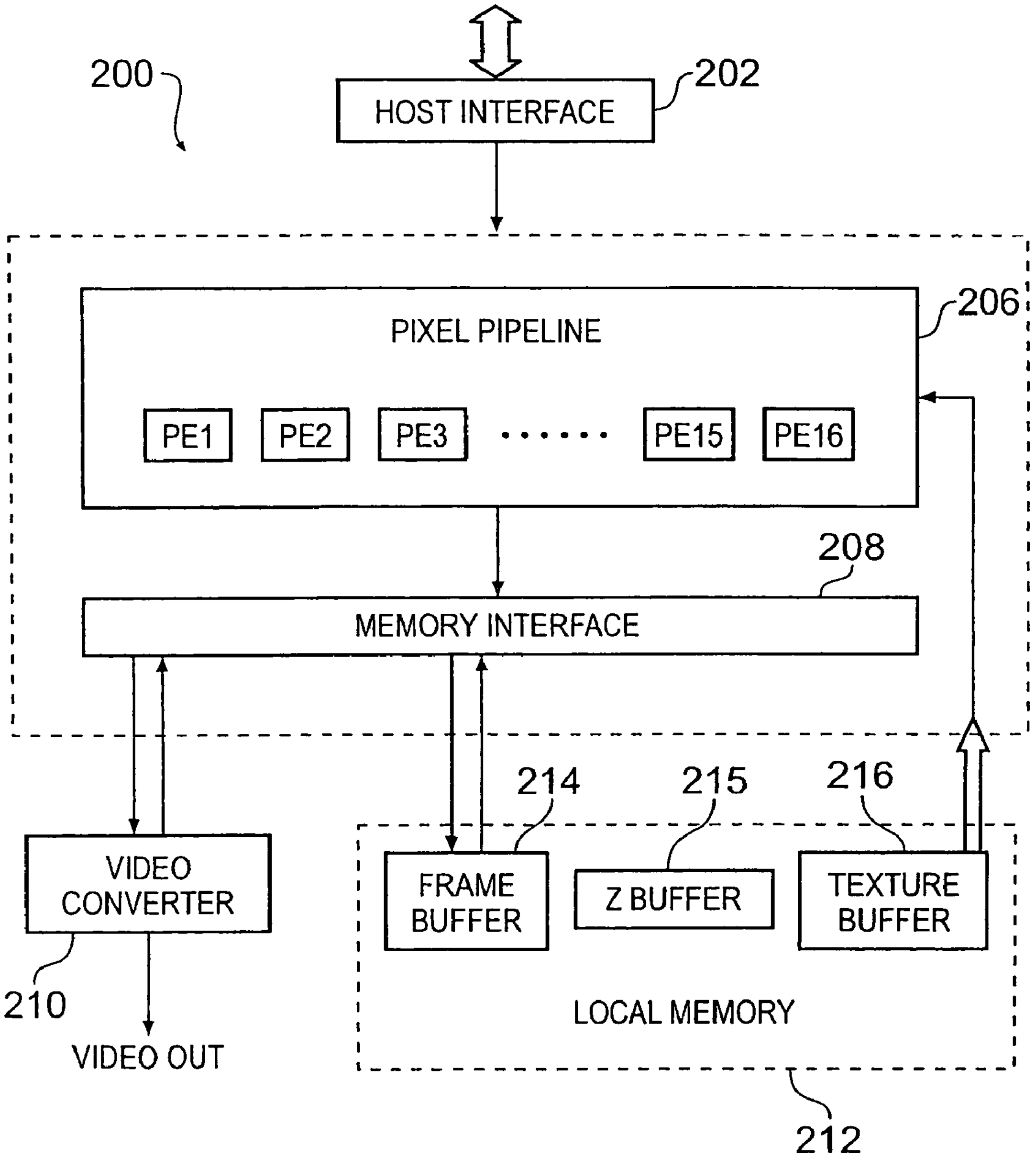
FIG. 3 schematically illustrates the configuration of a Graphics Synthesiser.

FIG. 3 schematically illustrates the configuration of the Graphic Synthesiser 200. The Graphics Synthesiser comprises: a host interface 202; a set-up/rasterizing unit; a pixel pipeline 206; a memory interface 208; a local memory 212 including a frame page buffer 214 and a texture page buffer 216; and a video converter 210.

The host interface 202 transfers data with the host (in this case the CPU core 102 of the Emotion Engine 100). Both drawing data and buffer data from the host pass through this interface. The output from the host interface 202 is supplied to the graphics synthesiser 200 which develops the graphics to draw pixels based on vertex information received from the Emotion Engine 100, and calculates information such as RGBA value, depth value (i.e. Z-value), texture value and fog value for each pixel. The RGBA value specifies the red, green, blue (RGB) colour components and the A (Alpha) component represents opacity of an image object. The Alpha value can range from completely transparent to totally opaque. The pixel data is supplied to the pixel pipeline 206 which performs processes such as texture mapping, fogging and Alpha-blending and determines the final drawing colour based on the calculated pixel information.

The pixel pipeline 206 comprises 16 pixel engines PE1, PE2, . . . , PE16 so that it can process a maximum of 16 pixels concurrently. The pixel pipeline 206 runs at 150 MHz with 32-bit colour and a 32-bit Z-buffer. The memory interface 208 reads data from and writes data to the local Graphics Synthesiser memory 212. It writes the drawing pixel values (RGBA and Z) to memory at the end of a pixel operation and reads the pixel values of the frame buffer 214 from memory. These pixel values read from the frame buffer 214 are used for pixel test or Alpha-blending. The memory interface 208 also reads from local memory 212 the RGBA values for the current contents of the frame buffer. The local memory 212 is a 32 Mbit (4 MB) memory that is built-in to the Graphics Synthesiser 200. It can be organised as a frame buffer 214, texture buffer 216 and a 32-bit Z-buffer 215. The frame buffer 214 is the portion of video memory where pixel data such as colour information is stored.

The Graphics Synthesiser uses a 2 D to 3 D texture mapping process to add visual detail to 3 D geometry. Each texture may be wrapped around a 3 D image object and is stretched and skewed to give a 3 D graphical effect. The texture buffer is used to store the texture information for image objects. The Z-buffer 215 (also known as depth buffer) is the memory available to store the depth information for a pixel. Images are constructed from basic building blocks known as graphics primitives or polygons. When a polygon is rendered with Z-buffering, the depth value of each of its pixels is compared with the corresponding value stored in the Z-buffer. If the value stored in the Z-buffer is greater than or equal to the depth of the new pixel value then this pixel is determined visible so that it should be rendered and the Z-buffer will be updated with the new pixel depth. If however the Z-buffer depth value is less than the new pixel depth value the new pixel value is behind what has already been drawn and will not be rendered.

The local memory 212 has a 1024-bit read port and a 1024-bit write port for accessing the frame buffer and Z-buffer and a 512-bit port for texture reading. The video converter 210 is operable to display the contents of the frame memory in a specified output format.

The present embodiment will be described with reference to a karaoke game (although it will be appreciated that embodiments of the invention are not limited to karaoke games). It is known for karaoke games to assess a player's singing by analysing the pitch of the player's voice input to the system unit 10 via the microphone 730. As such, this form of karaoke game will not be described in detail herein. However, there are songs that are not suited to such analysis, for example so-called "rap" songs, in which the performer, rather than singing the lyrics of the song, speaks the lyrics (albeit possibly rhythmically) to the accompanying backing track. As such, pitch analysis is not generally appropriate to this form of karaoke. The present embodiment therefore detects how well the player is speaking the lyrics. This will be described in more detail below.

It will be appreciated that it is possible for a karaoke game to have a mixture of rap and non-rap songs available, the karaoke game making use of pitch analysis for non-rap songs and speech analysis for rap songs. It will also be appreciated that these two types of analysis may be used in isolation (i.e. a player singing a non-rap song being assessed based on pitch analysis and not speech analysis; a player singing a rap song being assessed based on speech analysis and not pitch analysis) or in combination (i.e. a player singing a rap or non-rap song being assessed based on both pitch analysis and speech analysis).

Figure 4:
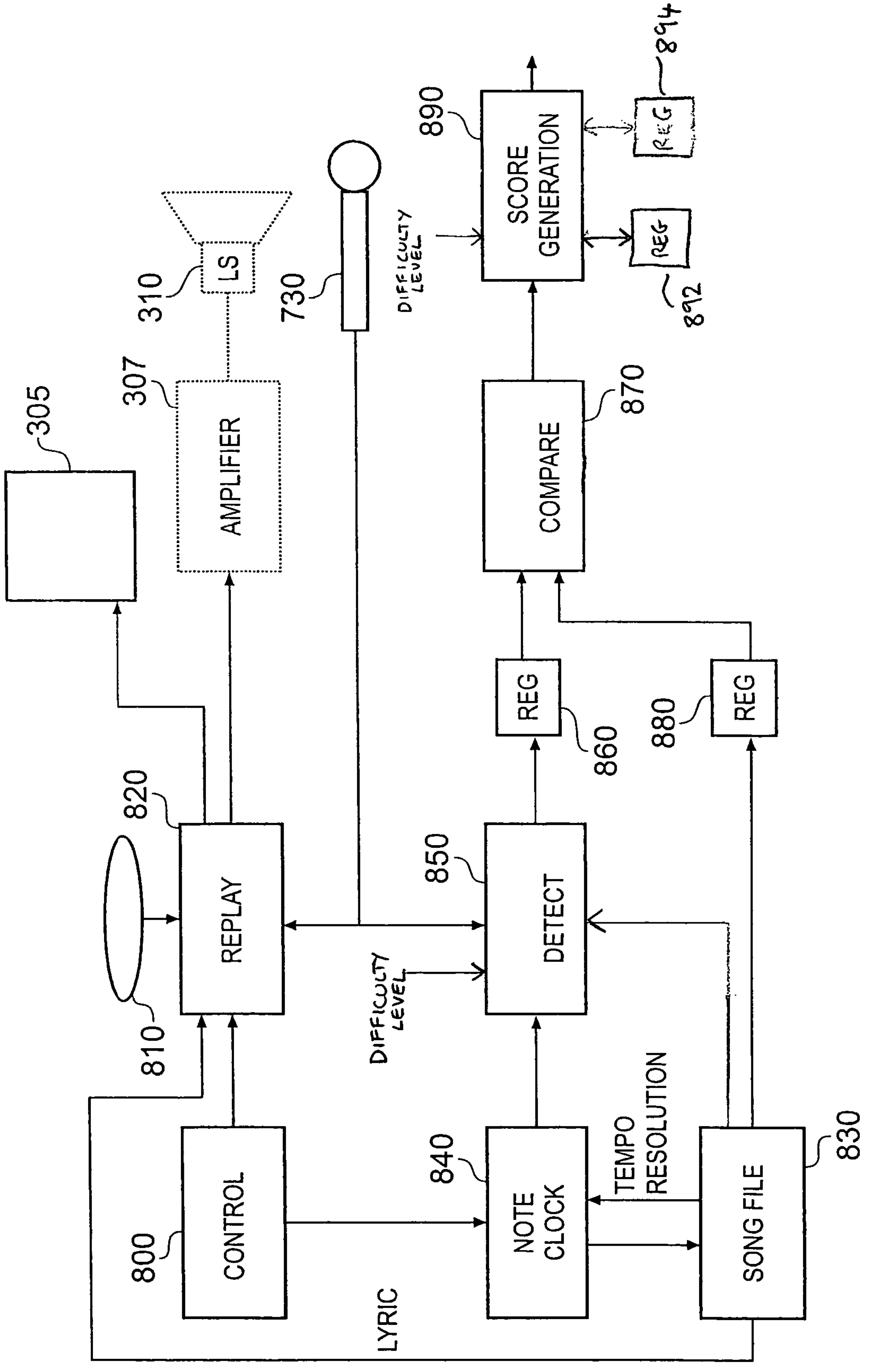
FIG. 4 schematically illustrates the logical functionality of a PlayStation2 machine in respect of an embodiment of the invention.

FIG. 4 schematically illustrates the logical functionality of a PlayStation2 machine in respect of an embodiment of the invention. The functions of blocks shown in FIG. 4 are, of course, carried out, mainly by execution of appropriate software, by parts of the PlayStation2 machine as shown in FIG. 1, the particular parts of the PlayStation2 machine concerned being listed below. The software could be provided from disk or ROM storage and/or via a transmission medium such as an internet connection.

To execute the above-mentioned karaoke game, control logic 800 initiates the replay of an audio backing track from a disk storage medium 810. The audio replay is handled by replay logic 820 and takes place through an amplifier 307 forming part of the television set 305, and the loudspeaker 310 also forming part of the television set 305.

The replay or generation of a video signal to accompany the audio track is also handled by the replay logic 820. Background images/video may be stored on the disk storage medium 810 or may instead be synthesised. Graphical overlays representing the lyrics to be sung/spoken are also generated in response to data from a song file 830 to be described below. The output video signal is displayed on the screen of the television set 305.

The microphone 730 is also connected to the replay logic 820. The replay logic 820 converts the digitised audio signal from the microphone back into an analogue signal and supplies it to the amplifier 307 so that a player can hear his own voice through the loudspeaker 310.

The song file 830 will now be described.

The song file 830 stores data defining the lyrics and notes which the user has to sing/speak to complete a current song, together with speech analysis information for performing the speech analysis. A part of an example of a song file is shown schematically in FIG. 5.

The song file 830 is expressed in XML format and starts with a measure of the song's tempo, expressed in beats-per-minute (not shown in FIG. 5). The next term is a measure of resolution (not shown in FIG. 5), i.e. what fraction of a beat is used in the note duration figures appearing in that song file 830. For example, if the resolution is "semiquaver" and the tempo is 96 beats per minute, then a note duration value of "1" corresponds to a quarter of a beat, or in other words 1/384 of a minute.

A number of "NOTE" attributes follow, the "NOTE" attributes forming part of a "SENTENCE" attribute. A note attribute comprises a "MidiNote" value, which represents a particular pitch at which the player is expected to sing, and a "Duration" value, which represents the duration of that note (which can be calculated in seconds by reference to the tempo and resolution information as described above). A "MidiNote" value of zero (i.e. no note) represents a pause for a particular duration (such as between words). In the midi-scale, middle C is represented by midi-number 60. The note A above middle C, which has a standard frequency of 440 Hz, is represented by midi-number 69. Each octave is represented by a span of 12 in the midi-scale, so (for example) top C (C above middle C) is represented by midi-number 72. It should be noted that in some systems, the midi-number 0 is assigned to bottom C (about 8.175 Hz), but in the present embodiment the midi-number 0 indicates a pause with no note expected.

A "NOTE" attribute also comprises a "Rap" value which, when set to a value of "Yes" indicates that the current note and associated lyric are to be assessed based on speech analysis rather than pitch analysis and, when set to a value of "No", indicates that the current note and associated lyric are to be assessed based on pitch analysis rather than speech analysis. The song file part shown in FIG. 5 is for a rap song and, as such, the "Rap" values of the "NOTE" attributes are set to "Yes". As such, the actual "MidiNote" value is not used in when assessing the player's performance of this song (as rap songs are assessed using speech analysis rather than pitch analysis).

A "NOTE" attribute may also comprise a "FreeStyle" value, which, when set to a value of "Yes" indicates that the song can be performed and analysed based on pitch analysis (rather than speech analysis) if, for example, the version of the game being played does not have functionality to handle rap songs (i.e. when the game version does not have the speech analysis functionality). This could occur, for example, when the disk storage medium 810 containing the song file 830 is used to supply data to a game version that is already being executed by the system unit 10, that game version being an earlier game version than the game version stored on the disk storage medium 810. Alternatively, the karaoke game may provide the user with the option to not analyse a rap song using speech analysis, but rather to use pitch analysis instead. In this case, setting the "Freestyle" value to "Yes" indicates that this option is available for this song.

A "NOTE" attribute also comprises a "Lyric" value. This might be a part of a word, a whole word or even (in some circumstances) more than one word. It is possible for the word to be empty, for example (in XML) "Lyric=" "", which may be used to when a pause is required (such as when the "MidiNote" value is set to 0).

A "NOTE" attribute may also comprise one or more "POINT" attributes. A "POINT" attribute specifies information that is used to perform the speech analysis for a particular "NOTE" attribute. More particularly, a "POINT" attributes specifies a target action (characteristic of or event in the input audio from the microphone 730) that is to be tested for to determine whether or not the user has successfully completed that "NOTE" (or a part thereof).

A "POINT" attribute also comprises a "Type" value that specifies the particular characteristic/event that is to be tested. The meaning of these point types, and the way in which they are detected, will now be described.

Overview

The type detection system begins with raw microphone samples and ends with per-note verdicts, which are used by the scoring system in the game. Here, 'low-level processing' refers to the sequence of steps from raw samples to a list of 'speech events'. 'Scoring' refers to the steps which go from these speech events to the per-note verdicts as to what "type" of event took place during a note period. Fundamentally, the system works by recognising basic speech elements in the microphone data and attempting to correlate them with a set of expected features tagged up in the melody file.

Low-Level Processing

In the type detection system, a 'frame' is 128 consecutive raw microphone samples. This corresponds to 1⁄375 of a second. Typically, six or ten frames are processed during each television frame.

In the first instance, each frame is classified as one of 'silence', 'fricative noise' or 'vocal noise'. The fricative/vocal decision is based on the roughness of the wave-form, and uses a simplified form of a so-called Hurst analysis, which is used to quantify the roughness of functional fractals.

Figure 7A:
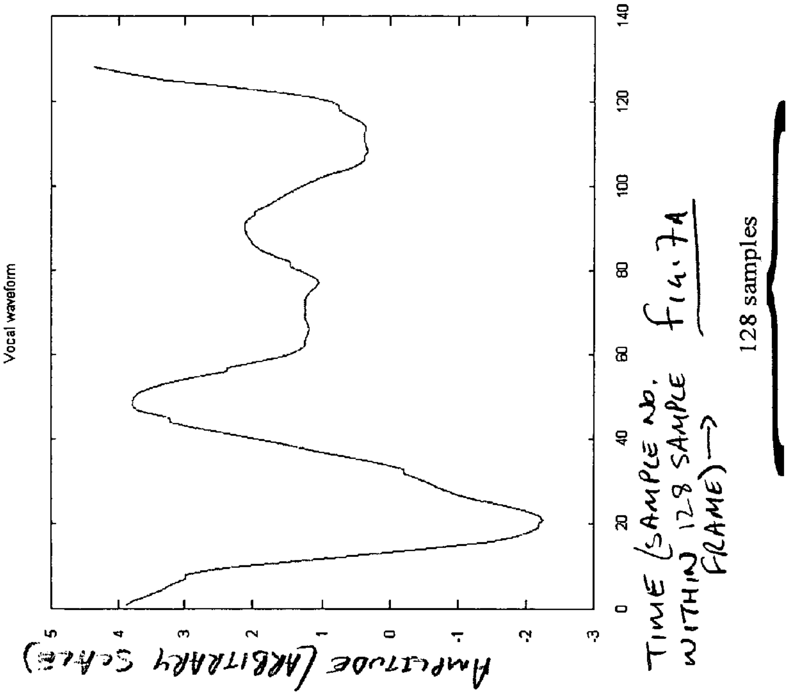
FIGS. 7A and 7B schematically illustrate audio properties of vocal noise and fricative noise respectively.
Figure 7B:
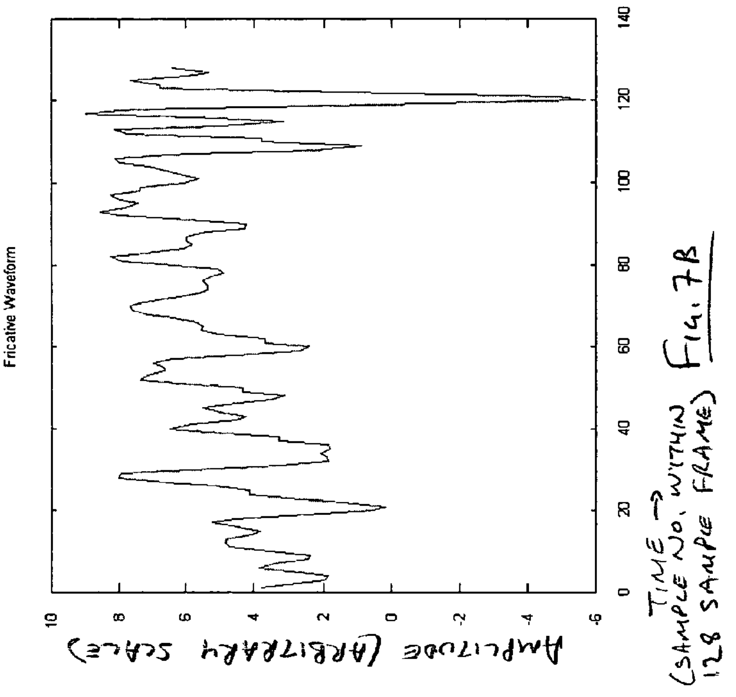

Fricative noise has a relatively high-frequency, relatively wide-band content which generates a very rough waveform that behaves like a function with a high fractal dimension—an example being shown in FIG. 7B. Vocal noise on the other hand has a relatively low-frequency, relatively narrow-band spectrum that has a low fractal dimension, an example being shown in FIG. 7A.

Hurst analysis can be understood in the following way:

The process starts with a set of sampled time-series data. The average magnitude of the change in sample value between samples that are, say, ten samples apart can be calculated. If an equivalent value is then calculated for a sample separation of 20, it would generally be expected to deliver a higher value. In fact if the data represent a straight line of non-zero gradient, or even a smooth curve, the second value will generally be twice as big as the first.

On the other hand, for a maximally fractal (i.e. very rough) set of data, the two values would tend to be about the same. This is the case for white noise, which consists of consecutive independently random samples. In this case, the distance between two samples has no statistical influence over the likely variation in their values.

The degree to which the average change in sample value increases with increasing sample separation provides a well defined quantification of the roughness of the data. In the context of a microphone waveform, this approach is extremely fast compared to spectral techniques, because it avoids the use of FFTs.

A full Hurst calculation would calculate values for many sample separations. In the rap system of the present embodiment, it has been found to be sufficient to use just three: the 3- and 12-sample separations ($v_3$ and $v_{12}$), and the large separation limiting value, $v_0$, which is just the mean sample value in a frame. Put simply, $v_0$, $v_{12}$ and $v_3$ essentially correspond to measures of volume tuned to low-, medium- and high-frequency bands. These values are formally defined by:

$$v_0 = \sum_i \text{abs}\{s_i\},$$

$$v_3 = \sum_i \text{abs}\{s_i - s_{i-3}\},$$

$$v_{12} = \sum_i \text{abs}\{s_i - s_{i-12}\},$$

The voice/fricative decision for the frame is then dependent on the ratios between the three volumes. Essentially, comparatively higher high-frequency volumes will lead to a fricative result; and a higher low-frequency volumes will lead to a voiced result.

The criterion for deciding that a noisy frame is fricative rather than vocal, arrived at by empirical trials, is:

$$\frac{v_3}{v_0} + \frac{v_3}{v_{12}} > 1.75$$

A silence conclusion will occur if all three volumes are below thresholds which are determined dynamically on a relatively short timescale.

The skilled man will of course understand that these outcomes are statistically generated based on a rapid analysis of a sample of the audio signal. They may or may not represent the true situation, but have been found in empirical tests to give a useful indication for the purposes of scoring a karaoke type game.

Special Case for Low Frequency Voices

There is a special case which has to be considered for low frequency voices. Since the duration of a frame (1/375 second) is substantially shorter than the period of the wave-form for a low audio frequency, it is possible for the lowest frequency values ($v_0$) to exhibit a periodic fluctuation (e.g. as a result of aliasing effects), where perhaps one or two out of every three frames records an artificially low value. In the absence of a correction, this could cause a rapid alternation between fricative and vocal conclusions.

A correction can be made by increasing the value of $v_0$ for each frame to the larger of its two immediate neighbours. As an example, consider the sequence of $v_0$ values 551551551551, where each successive single-digit value represents a level of $v_0$ in a corresponding frame. This example sequence might be detected for a voiced input at about 120 Hz. The sequence is automatically corrected, using the above rule, to 555555555555. This results, correctly, in a stream of consecutive voice results.

Speech Events

Figure 8:
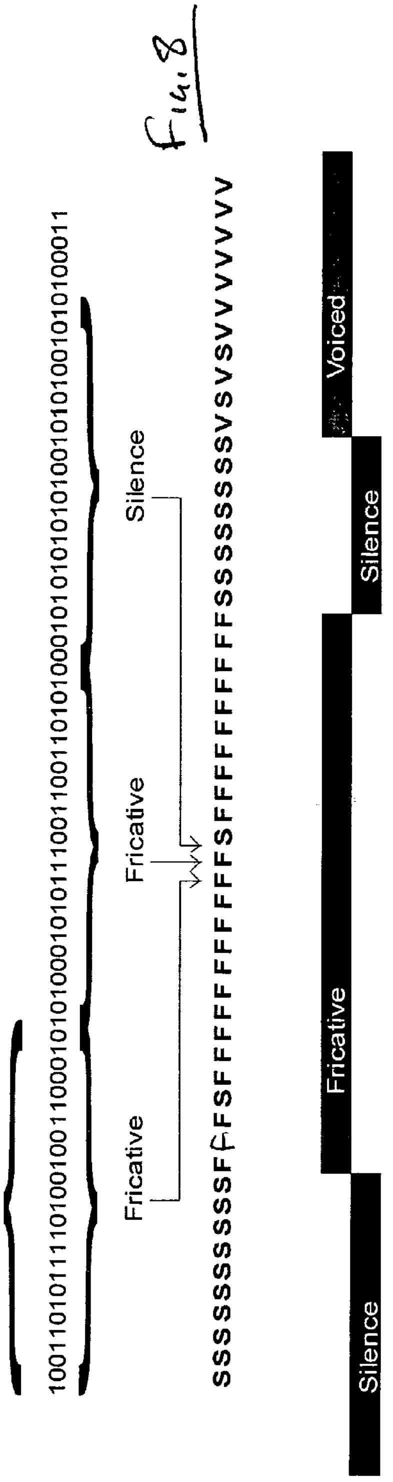
FIG. 8 schematically illustrates the division of and audio signal into speech intervals.

In the next level of processing, sequences of consecutive similar results are grouped into a list of intervals, or speech events. Each interval is described by a start time, a stop time and a categorisation of silence, fricative or voice. This process is shown schematically in FIG. 8, in which frames of 128 samples (top row) are classified as Fricative (F), Silence (S) or Voice (V) (second row), and these classifications are grouped into speech events (bottom row).

The criteria for switching from one state to another are as follows:

| | To fricative | To voice | To silence |
|---|---|---|---|
| From fricative: | — | 3 consecutive voice frames. | 4 consecutive silent frames |
| From voice: | 2 consecutive fricative frames | — | 4 consecutive silent frames |
| From silence: | 2 consecutive fricative frames | 5 voiced frames out of 7, and a minimum cumulative volume. | — |

In addition, there are two situations where multiple events can occur simultaneously.

Two noisy events within the same category will be combined into one if they are separated by a very short silent interval. In this case, the two intervals are added to the feature list individually, and as a single combined interval. The separation intervals are 0.06 s for voiced intervals, and 0.035 s for fricative intervals.

The $v_0$ profile during a voiced interval is continuously monitored. A very narrow trough in the volume vs time relationship during the note is interpreted as an 'almost silence'. The interval is then split into two voiced intervals. The unbroken interval is also added to the feature list.

Type Detection and Scoring

The rap scoring works by comparing the list of intervals generated from the 15 microphone data to a list of expected events described in the melody file. There are nine different types of events that the scoring system can detect:

| Type | Usage |
|---|---|
| "Fric" | Extended fricative sound, eg "FFF" or "SSS". |
| "Short Fric" | Plosive fricative sound, eg "k" or "t". |
| "Fric End" | End of a fricative sound. |
| "Voice" | A voiced period, eg "ah" in "Fast". |
| "Voice Begin" | Commencement of a voiced syllable. |
| "Voice End" | End of a voiced period. |
| "Voice Inside" | Fully voiced interval |
| "Stop" | A brief period of silence corresponding to the closing of the airway, usually preceding a plosive sound. Eg between the "S" and the "t" in "stop". |
| "Glottal" | A scoring type which will accept either a short fricative or a stop. |
| "Start" | Not a scoring element. "Start" points mark out sections of the song to be considered in isolation. |

The replay logic 820 uses the song file 830 to determine what to display on the screen of the television 305 to prompt the player how to play the karaoke game. This may include (i) the "Lyric" value so that the player knows what words to sing/speak and (ii) "POINT" attributes so that the player knows what target actions are being assessed.

In the present example, the song file 830 does not define the backing track which the player will hear and which in fact will help prompt the player to sing the song. The backing track is recorded separately, for example as a conventional audio recording. This arrangement means that the backing track replay and the reading of data from the song file 830 need to start at related times (e.g. substantially simultaneously), something which is handled by the control logic 800. However, in other embodiments the song file 830 could define the backing track as well, for example as a series of midi-notes to be synthesised into sounds by a midi synthesiser (not shown in FIG. 4, but actually embodied within the SPU 300 of FIG. 1).

Returning to FIG. 4, a note clock generator 840 reads the tempo and resolution values from the song file 830 and provides a clock signal at the appropriate rate. In particular, the rate is the tempo multiplied by the sub-division of each beat. So, for example, for a tempo of 96 and a resolution of "semi-quaver" (quarter-beat) the note clock 840 runs at 96×4 beats-per-minute, i.e. 384 beats-per-minute. If the tempo were 90 and the resolution were "quaver" (half-beat) then the note clock 840 would run at 180 (90×2) beats-per-minute, and so on.

The note clock 840 is used to initiate reading out from the song file 830 of the various attributes of the song and also to control the detection of audio input (the player's actions) from the microphone 730 by a detector 850.

With regard to speech analysis, the signal from the USB microphone 730 is also supplied to the detector 850. This operates as described above. The detector 850 receives a difficulty level value as set by the player of the karaoke game. This difficulty level may be used to alter how the detection of characteristics/event occurs. For example, when comparing input frequency domain data with known frequency domain characteristics, the detector alters the degree to which the input frequency domain data must match the known frequency domain characteristics in order for a detection of, say, a fricative sound, to occur. Alternatively, the threshold levels for starting/ending/maintaining speech input can be varied to make the detection of speech/silence easier or more difficult to achieve. Finally, the period in which the characteristic/event is to occur may be altered to make detection easier or more difficult (such as extending a period to make detection easier/more likely).

Although full speech recognition could be used to determine what actual words are being spoken by the player, this is not actually necessary. Indeed, due to the additional processing overhead that this could cause and the possible additional latency, such full speech recognition is less preferable than the speech analysis described above.

The detection result (e.g. silence, speech beginning, fricative sound, etc.) is supplied to a buffer register 860 and from there to a comparator 870. The corresponding target action (desired characteristics/event) from the song file 830 is also read out, under the control of the note clock 840, and is supplied to another buffer register 880 before being passed to the comparator 870.

The comparator 870 is arranged to compare the target action from the song file with the/any detected characteristic/event occurring in the input audio signal (i.e. the player's action) during the period specified in the song file 830.

For scoring purposes, the comparator 870 detects whether the player has performed the target action (i.e. whether the input audio signal contains the desired characteristic/event during the interval specified by the song file 830). This is achieved by a comparison of the data stored in the buffer registers 860, 880. This result is passed to scoring logic 890.

The scoring logic 890 receives the results of the comparison by the comparator 870 and generates a player's score from them. At the beginning of a song, the scoring logic is set to a non-scoring mode. In the non-scoring mode, the scoring logic 890 detects whether the results of the comparisons by the comparator 870 conform to a first pattern of successfully and unsuccessfully completed target actions. For example, this first pattern could be nine successfully completed target actions with at most three unsuccessfully completed target actions occurring amongst the nine successfully completed target actions. If the scoring logic 890 detects the first pattern, it enters a scoring mode (leaving the non-scoring mode). Whilst it will be appreciated that the first pattern could be any pattern of successfully and unsuccessfully completed target actions, in the current embodiment, the first pattern is a sequence of successive target actions that have been successfully completed, the sequence having a predetermined length. As such, the scoring logic maintains a count, in a register 892, of the number of successive target actions (events/characteristics specified by the song file 830) that are successfully completed by the player (as detected by the detector 850 and the comparator 870). When this count exceeds a threshold number, the scoring logic enters a scoring mode.

When in the scoring mode, the scoring logic 890 detects whether the results of the comparisons by the comparator 870 conform to a second pattern of successfully and unsuccessfully completed target actions. For example, this second pattern could be four unsuccessfully completed target actions with at most one successfully completed target action occurring amongst the four unsuccessfully completed target actions. If the scoring logic 890 detects the second pattern, it enters the non-scoring mode (leaving the scoring mode). Whilst it will be appreciated that the second pattern could be any pattern of successfully and unsuccessfully completed target actions, in the current embodiment, the second pattern is a sequence of successive target actions that have not been successfully completed, the sequence having a predetermined length. As such, the scoring logic 890 maintains a count, in a register 894, of the number of successive target actions (events/characteristics specified by the song file 830) that are not successfully completed by the player (as detected by the detector 850 and the comparator 870). When this count exceeds a threshold number, the scoring logic returns to the non-scoring mode.

The player only accumulates a score whilst the scoring logic is in the scoring mode.

Figure 6:
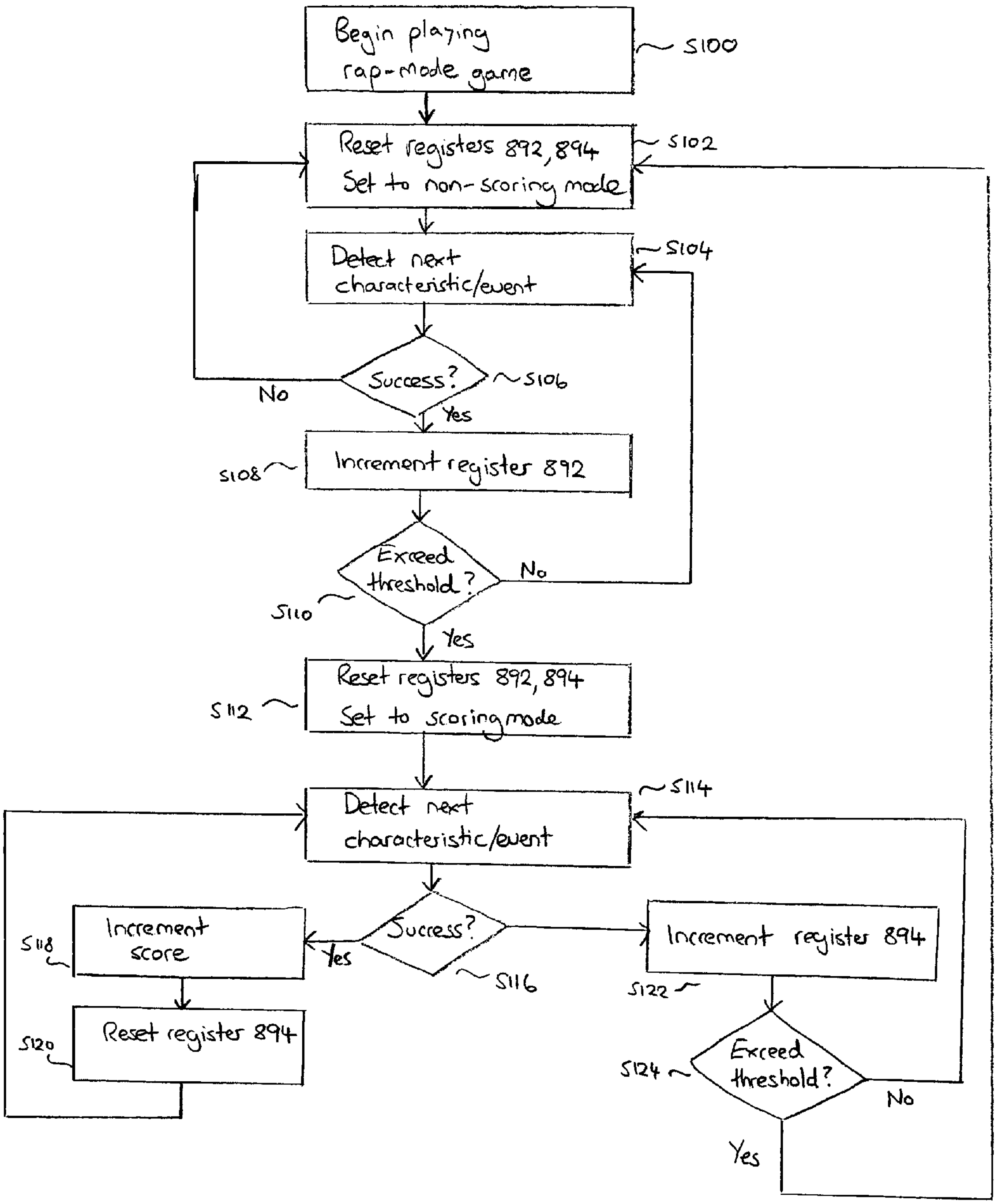
FIG. 6 is a schematic flowchart of scoring logic operation.

FIG. 6 schematically illustrates the operation of the scoring logic 890.

At a step S100, the karaoke game begins for a song in the rap-mode. This corresponds to a song for which the song file 830 has the "Rap" value set to "Yes" in its "NOTE" attributes.

At a step S102, the values of the registers 892 and 894, indicating respectively the number of successive target actions that have been successfully completed and the number of successive target actions that have not been successfully completed, are reset to 0 and the scoring logic 890 is set in the non-scoring mode.

At a step S104, the detector 850 detects a characteristic/event in the input audio at the time specified in the song file 830 for the next target action. The comparator 870 then determines whether the detected characteristic/event corresponds to that next target action, i.e. whether that next target action has been successfully completed by the player. The scoring logic 890 is informed of this determination. It should be noted that throughout a song, the system maintains a list of all the scoring events that are expected to occur within about one second of the current time. Each event generated by the microphone is compared to all the scoring points in the current list. The scoring point is as successful as the most closely matched event.

Each scoring point is attached to a note. Each note can have zero, one or more scoring points attached to it. In addition to evaluating these scoring points, the system also monitors whether or not any noise was detected at the microphone during the note.

For a successful verdict on a note, there are two requirements: (a) some noise must have been detected during the note, and (b) (as described below with reference to step S112) the note must be inside a run of several successful scoring points.

If, at a step S106, the comparator has determined that the next target action has not been successfully completed, then processing returns to the step S102. However, if it is determined that the next target action has been successfully completed, then processing continues at a step S108 at which the value in the register 892 is incremented.

If, at a step S110, it is determined that the number of successive target actions that have been successfully completed (as recorded in the register 892) does not exceed a success threshold value, then processing returns to the step S104. However, if it is determined that the number of successive target actions that have been successfully completed (as recorded in the register 892) does exceed the success threshold value, then processing continues at a step S112 at which the values in the registers 892 and 894 are reset to 0 and the scoring logic 890 enters a scoring mode.

At a step S114, the detector 850 detects a characteristic/event in the input audio at the time specified in the song file 830 for the next target action. The comparator 870 then determines whether the detected characteristic/event corresponds to that next target action, i.e. whether that next target action has been successfully completed by the player.

The scoring logic 890 is informed of this determination. This is the same as at the step S104.

If, at a step S116, the comparator has determined that the next target action has been successfully completed, then processing continues at a step S118 at which the player's score is incremented (as the scoring logic 890 is in the scoring mode and the player has successfully completed a target action).

Processing then continues at a step S120 at which the value of the register S894 is set to 0. Processing returns to the step S114.

However, if it is determined at the step S116 that the next target action has not been successfully completed, then processing continues at a step S122 at which the value in the register 894 is incremented.

If, at a step S124, it is determined that the number of successive target actions that have not been successfully completed (as recorded in the register 894) does not exceed a failure threshold value, then processing returns to the step S114. However, if it is determined that the number of successive target actions that have not been successfully completed (as recorded in the register 894) does exceed the failure threshold value, then processing returns to the step S102, thereby leaving the scoring mode and returning to the non-scoring mode.

The success and failure threshold values used at the steps S110 and S124 respectively may be different values and, in preferred embodiments, the success threshold value used at the step S110 is larger than the failure threshold value used at the step S124. Furthermore, in preferred embodiments, the scoring logic adjusts the success and failure thresholds in dependence upon a difficulty level set by the player. In particular, the more difficult the level, the greater the success threshold and/or the lower the failure threshold.

It will be appreciated that the registers 892, 894 (and possibly extra registers as required) may be used by the scoring logic 890 to detect other patterns of successfully and unsuccessfully completed target actions, these registers storing a history of the pattern of target actions that have been successfully and unsuccessfully completed by the player's actions.

FIG. 4 schematically illustrates the operation of the embodiment as a set of logical blocks, for clarity of the description. Of course, although the blocks could be implemented in hardware, or in semi-programmable hardware (e.g. field programmable gate array(s)), these blocks may conveniently be implemented by parts of the PlayStation2 machine system schematically illustrated in FIG. 1 under the control of suitable software. One example of how this may be achieved is as follows:

| | |
|---|---|
| Control logic 800<br>Note clock generator 840<br>Detector 850<br>Registers 860, 880, 892, 894<br>Comparator 870<br>Scoring logic 890 | Emotion engine 100, accessing:<br>HDD 390,<br>ROM 400,<br>RDRAM 500 etc |
| Replay logic 820 | Emotion engine 100, accessing:<br>DVD/CD interface 450<br>SPU 300 (for audio output)<br>IOP 700 (for microphone input)<br>GS 200 (for video output) |

In so far as the embodiments of the invention described above are implemented, at least in part, using software-controlled data processing apparatus, it will be appreciated that a computer program providing such software control and a storage medium by which such a computer program is stored are envisaged as aspects of the present invention.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Game processing apparatus comprising:

an indication generator operable to generate an indication of a sequence of target actions to be executed by a user;

a detector operable to detect user actions executed by said user;

comparison logic operable to compare said target actions with said user actions to determine whether said target actions have been successfully completed by said user actions; and scoring logic operable in a scoring mode and a non-scoring mode, said scoring logic being operable:

(a) in said non-scoring mode, to count a first pattern comprising a first plurality of successive target actions that have been successfully completed, as determined by said comparison logic, said scoring logic entering a scoring mode upon detection of said first pattern, said count being reset to zero by a target action not successfully completed; and (b) in said scoring mode, to count a second pattern comprising a second plurality of successive target actions that have been successfully completed, as determined by said comparison logic, said count being reset to zero by a target action successfully completed, said scoring logic entering said non-scoring mode upon detection of said second pattern;

in which said scoring logic is operable to generate a score for said user in respect of each user action representing successful completion of a target action, only when said scoring logic is in said scoring mode, said score being dependent upon said determination by said comparison logic.

2. Apparatus according to claim 1, in which said first pattern comprises a first predetermined threshold number of successive target actions that have been successfully completed and said second pattern comprises a second predetermined threshold number of successive target actions that have not been successfully completed.

3. Apparatus according to claim 2, in which said first predetermined threshold is greater than said second predetermined threshold.

4. Apparatus according to claim 1, in which:

said target actions comprise said user making and/or not making target sounds;

said user actions comprise said user making and/or not making sounds; and said detector comprises a microphone.

5. Apparatus according to claim 4, in which said indication comprises an indication of one or more words to be spoken by said user, said words corresponding to said target sounds.

6. Apparatus according to claim 4, in which one or more of said target sounds comprises a fricative sound and/or a glottal sound.

7. Apparatus according to claim 1, in which said target actions have associated target time periods of execution, said comparison logic determining whether one of said target actions has been successfully completed by one of said user actions in dependence upon whether said one of said user actions is detected within said target time period associated with said one of said target actions.

8. Apparatus according to claim 7, operable to vary said predetermined time period in dependence upon a game level.

9. Apparatus according to claim 2, operable to vary said first predetermined threshold or said second predetermined threshold in dependence upon a game level.

10. Apparatus according to claim 1, comprising:

a reader operable to read data stored on a storage medium when said storage medium is associated with said reader, said data defining said target actions.

11. A method of game processing comprising:

providing a processor, said processor coupled with a storage device, the storage device storing instructions configured to direct the processor to perform steps of:

an indication generating step to generate an indication of a sequence of target actions to be executed by a user;

a detection step to detect user actions executed by said user;

a comparison step to compare said target actions with said user actions to determine whether said target actions have been successfully completed by said user actions; and a scoring step including—scoring logic operable in a scoring mode and a non-scoring mode, said scoring logic being operable:

(a) in said non-scoring mode, to count a first pattern comprising a first plurality of successive target actions that have been successfully completed as determined by said comparison step, and to enter a scoring mode upon detection of said first pattern, said count being reset to zero by a target action not successfully completed; and (b) in said scoring mode, to count a second pattern comprising a second plurality of successive target actions that have been successfully completed as determined by said comparison step, said count being reset to zero by a target action successfully completed, and to enter said non-scoring mode upon detection of said second pattern;

in which said scoring step generates a score for said user in respect of each user action representing successful completion of a target action, only when said scoring step is in said scoring mode, said score being dependent upon said determination by said comparison step.

* * * * *